US005811122A

United States Patent [19]

Schlup et al.

[11] Patent Number: 5,811,122

[45] Date of Patent: Sep. 22, 1998

[54] HIDE/POLYMER AND LEATHER/POLYMER COMPOSITE MATERIALS FORMED BY IN SITU POLYMERIZATION OF POLYMER PRECURSORS IMPREGNATED INTO HIDE AND LEATHER

[75] Inventors: John R. Schlup; L. T. Fan, both of Manhattan, Kans.

[73] Assignee: Kansas State University Research Foundation, Manhattan, Kans.

[21] Appl. No.: 756,439

[22] Filed: Nov. 26, 1996

Related U.S. Application Data

[63] Continuation-in-part of Ser. No. 451,681, May 26, 1995, abandoned.

[51] Int. Cl.[6] .......... B32B 9/02

[52] U.S. Cl. .......... 424/473; 428/540; 428/306.6; 428/447

[58] Field of Search .......... 428/473, 540, 428/306.6, 447

[56] References Cited

U.S. PATENT DOCUMENTS

| | | | |
|---|---|---|---|
| 3,066,997 | 12/1962 | Neher et al. | 8/94.21 |
| 3,103,447 | 9/1963 | Lowell et al. | 117/76 |
| 3,231,420 | 1/1966 | Lowell et al. | 117/142 |
| 3,444,365 | 5/1969 | Lowell et al. | 8/94.21 |
| 3,887,758 | 6/1975 | Butler et al. | 428/540 |
| 5,183,845 | 2/1993 | Perkinson | 524/726 |

OTHER PUBLICATIONS

Buechler, P.R. et al., "Radiation Polymerized Graft Copolymers for Leather"; *Renewable–Resource Materials* (C.E. Garraher, Jr. and L. H. Sperling, Eds.) (Plenum Press, New York, 1986) pp. 251–258.

Harris, E.H., "Graft Polymerization. III. Some Properties of teh Leather Obtained . . . Onto Chrome–Taned Nigerian Hairsheep", *J. Am. Leather Chem. Assoc.*, 69, 182 (1974).

Jordan, E.F. et al., "Polymer–Leather Composites. I. Process and Location Study . . . by Polymerization into Chrome–Tanned Cattlehide", *J. Appl. Poly. Sci.* 25, 2621–2647 (1980).

Jordan, E.F., Jr. et al, "Polymerization–Leather Composites. II. Kinetics of the Deposition . . . into Chrome–Tanned Cattlehide", *J. Appl. Polm. Sci.* 25, 2755–2776 (1980).

Jordan, E.F., Jr. et al., "Polymer–Leather Composites v. Preparative Methods . . . Polymer–leather Composite Materials", *Polymer Applications of Renewable–Resource Materials* (Polymer Science and Technology, vol. 17) (C.E. Carraher, Jr. and L.H. Sperling, Eds.) (Plenum Press, New York, 1983) pp. 407–452.

Kronick, P.L. et al., "Viscoelasticity of Calf Hide Impregnated with Radiation–Polymerized Polyhydroxyethyl Methacrylate", *Renewable Resource Materials* (C.E. Carraher, Jr. and L.H. Sperling, Eds.) (Plenum Press, New York, 1986) pp. 235–250.

Kronick, P.L. et al., "Dynamic Mechanical Properties of Polymer–Leather Composites", *J. Appl. Phys.* 30, 3095–3106 (1985).

Rao, K.P. et al., "Characterization of the Collagen–Vinyl . . . II. Infared Spectra and electron Microscopy", *J. Appl. Polymer Sci.*, 16, 975–0986 (1972).

Rao, K.P. et al., "Characterization of the Collagen–Vinyl . . . I. Solution Properites", *J. Appl. Polymer Sci.*, a–1, 9, 3199–3212 (1971).

*Primary Examiner*—S. Mark Clardy
*Assistant Examiner*—Michael A. Williamson
*Attorney, Agent, or Firm*—Hovey, Williams, Timmons & Collins

[57] ABSTRACT

Hide/leather-polymer composite materials are provided by the impregnation of polymer systems into interstitial void spaces in the collagen fiber network of the hide/leather precursors, providing a broad spectrum of composite materials possessing a wide variety of bulk mechanical properties. Preferably, the polymer systems employed in the inventive composites are bismaleimides, when high modulus, strength and flexural modulus are desired, and siloxane-based polymers, when elastomeric bulk properties are desired.

15 Claims, 8 Drawing Sheets

HIDE/POLYMER AND LEATHER/POLYMER COMPOSITE MATERIALS FORMED BY IN SITU POLYMERIZATION OF POLYMER PRECURSORS IMPREGNATED INTO HIDE AND LEATHER

This application is a continuation-in-part, of application Ser. No. 08/451,681 filed May 26, 1995, now abandoned.

BACKGROUND OF THE INVENTION

1. Field of the Invention

The present invention is broadly concerned with improved, polymer impregnated hide and leather composite materials and a process for the formation of such composite materials. The process involves in situ polymerization of polymer precursors previously impregnated into hide or leather for the purpose of improving the notch toughness, impact resistance, machinability, vibration dampening, compressibility, elastomeric, and sealing qualities of the composite materials.

2. Background

Individually, hide and leather (hereinafter "hide/leather") and polymer materials have been used for decades in a wide variety of applications. Although relatively tough, scuff resistant and inexpensive hide/leather lacks in relative tensile strength and modulus qualities. Relatively brittle polymer systems, on the other hand, tend to have physical properties with relatively high tensile strength and modulus values, but are typically brittle at ambient temperatures, and thus lack toughness and scuff resistant qualities. In addition, engineering polymers tend to be more expensive than hide/leather. While compliant at ambient temperatures, elastomeric polymer systems can have tensile strengths and modulus values lower than hide/leather materials. Engineering thermoplastics tend to be expensive materials.

Various processes are known which involve the partial impregnation into, or coating of, leather materials to improve the toughness and scuff resistant properties of leather materials. The following are examples: (i) U.S. Pat. No. 3,066,997 discloses the partial impregnation of a tanned leather (in the crust condition) by the application only to the leather grain side of a reaction product of a polyisocyanate or a polyisothiocyanate with a poly functional alcohol, amine, or amino alcohol or an organic solvent solution of such a reaction product; (ii) U.S. Pat. No. 3,103,447 discloses the partial impregnation of leather (15% impregnation of leather thickness is preferred) with aqueous polymeric systems involving polymerizable monoethylenically unsaturated acids, especially acrylic acid, with esters; (iii) U.S. Pat. No. 3,231,420 discloses the partial impregnation of leather in the crust state (15% impregnation of leather thickness is preferred) with an organic solvent solution of certain acrylic copolymers; and (iv) U.S. Pat. No. 3,441,365 discloses the partial impregnation of leather (15% impregnation of the leather thickness on both sides is preferred) with a reaction product of certain polyisocyanates or polyisothiocyanates and acrylic copolymers. The references noted above are aimed at the production of leather products that remain soft and flexible (i.e., '997, col 1, In 57–59), or which retain their natural perspiration vapor absorptive and permeability characteristics needed for shoe leather (i.e., '447, col 2, ln 50–62; '402, col 6, ln 15–49; '365, col 9, ln 20–31). In the latter respect, full impregnation of the leather is deliberately avoided in the prior art because full impregnation of the leather with more than small quantities of polymer will make the leather unsuitable for shoe uppers.

Further, the prior art places emphasis on the use of polymer system precursors (including preformed polymers) having relatively low viscosities, implying low molecular weights (i.e., on the order of 10000—'420, col 2, in 60), to achieve satisfactory impregnation of the precursors into leather grain.

Generally speaking, the focus of much of the prior art has been upon the improvement of flexibility and scuff resistance of leather products without regard to bulk mechanical properties of the leather, such as strength and modulus. Yet further, the thrust of the prior art has been to use polymeric systems to improve leather, with little regard to whether leather and hide products can be used to improve the bulk mechanical properties of polymers. The emphasis has not been the formation of novel materials systems with properties unique with respect to the components.

For example, U.S. Pat. No. 3,887,758 describes an oil resistant leather product wherein a mixture of hydroxyl endblocked dimethylpolysiloxane, a hydroxyl-containing phenyl siloxane resin and a silane are mixed in a suitable solvent and contacted with leather. Estimates of the amount of polymer takeup using the techniques described in the '758 patent indicate that the maximum amount of polymer in the finished products is on the order of 7% by weight. It is believed that the products described in this patent do not have desirable properties of compressibility, flame resistance and dielectric strength and resistivity, and that these products are characterized merely by an essential surface treatment of the starting leather.

Accordingly, there is a need for such improved composite materials whether they be viewed as improvement of hide/leather properties by its impregnation with polymeric systems, or polymeric systems improved by impregnation of the polymer into hide/leather. Such improved hide/leather polymer composite materials are needed in the hide and leather industries, gasket and packing industries, and in industries requiring vibration dampening materials (as part of laminated structures), impact resistant composite materials and structural composite materials.

SUMMARY OF THE INVENTION

The present invention overcomes the problems outlined above and provides improved hide/leather/polymer composite materials (hereinafter "HLP") having improved toughness and impact resistant qualities, while retaining many other desirable bulk physical properties associated with the polymer materials (i.e., tensile strength, modulus or elasticity).

The invention is predicated upon the discovery that new HLP composite materials may be formulated by impregnating into the interstitial void spaces in the collagen fiber network of the hide/leather precursors of any of a broad spectrum of polymeric systems to achieve, upon curing, a composite material possessing desirable mechanical bulk properties before unknown. In this way, it is possible to combine into the HLP composite material the desired bulk properties of the polymer system with the desired bulk properties of the hide/leather materials. The instant invention may be practiced to achieve such superior HLP composite materials provided only that the chemistry of the polymer system is such that (i) the viscosity of the polymer system precursors can be made sufficiently low at impregnation temperatures (typically <200° C.—below the thermal degradation temperature of the hide/leather) to permit the full impregnation into the interstitial void spaces between the collagen fibers making up the collagen fiber matrix of the hide/leathers (often requiring the proper choice of solvent); (ii) the impregnation temperatures, though high enough to establish a reduced viscosity permitting impregnation, are lower than the temperatures that lead to polymerization; and (iii) the polymer system precursors can be made to react at temperatures below the thermal degradation temperature of hide/leather (sometimes requiring the proper choice of catalyst).

The Polymer Systems

The instant invention can be practiced with any number of polymer systems including:

1. Thermosetting Resins

Phenolics

Melamines

Unsaturated polyesters

Polyurethanes

Alkyd resins

Allyl resins

2. Heterochain Thermoplastics

Polyamides

Polyesters

Polycarbonates

Polyetherimides

3. Carbon-chain Polymers

Polystyrene and polystyrene copolymers

Acrylic polymers (including poly(methyl methacrylate))

Poly(vinyl chloride)

Preferably the polymer systems employed in the HLP composites are bismaleimides when high modulus, strength and flexural modulus bulk properties are desired and siloxane-based polymers when elastomeric bulk properties are desired.

An HLP composite material can be provided in accordance with the instant invention even where average molecular weight of the polymer systems employed exceeds 10,000 and the viscosity exceeds 1,000 centipoise.

The Solvents

The particular solvent may be composed of a single solvent material or it may be composed of a mixture of solvents. Any solvents may be used which are compatible with the particular polymer precursors to achieve a viscosity sufficiently low such that of the precursor/solvent solution fully impregnates into the hide/leather.

The solvent that is to be employed for impregnation of the hide/leather may be used in the preparation of the precursor solution itself so that there is no need to recover the polymer from the precursor solution formed for redissolution of such polymer into a different impregnation solvent.

Preparing the Polymer System Precursors

The choice of proportions of the precursors to be used depends in part upon the bulk properties desired in the HLP composite. When siloxane based HLP composites are desired, the bis-benzene:DMS molar ratio in solvent solution can be from 0.5:1 to 2:1, and is preferably about 1:1. When bismaleimide HLP composite materials are desired, the ratio of BMI-to-DDM molar ratio in solvent solution can be from 0.5:1 to 2:1, and is preferably about 1.3:1. The concentration of the precursor solution may vary widely. For example, the total mass of polymer can be 5 to 50% mass. Thus the polymer precursor present in the precursor solutions can range from about 5–50% by weight, based upon the weight of the dry, starting hide or leather to be treated, and more preferably from about 10–40% by weight on this basis. The use of higher precursor solution concentrations beyond 50wt % may be permissible, for any given molecular weight, precursor provided the resulting viscosity of the solution permits impregnation as defined hereinabove.

The instant invention may be practiced using precursor solution with a viscosity of 0.25 to 1000 centipoise at the impregnation temperature. The instant invention can be practiced at temperatures as low as that of dry ice. The lower temperature limit for impregnation is determined by either the freezing point of the solution or the viscosity of the solution. The upper temperature limit of the instant invention is the boiling point of the solvent or precursor, and the decomposition temperature of hide.

The precursor solution may also contain additional materials (such as dyes, pigments, and plasticizers) desirable for any particular polymer formulation.

Impregnation of the Precursors into the Hide/Leather

The precursor solution may be applied and impregnated into the hide/leather in any fashion (e.g., by capillarity, diffusion or pressure mechanisms) provided that it is applied under such conditions that time is available for full penetration before extensive drying of the solution or extensive polymerization of the polymer occurs. In the preferred method for siloxane based HLP composite materials, the hide/leather is presoaked in solvent for a period of time to assure full penetration of the solvent within the hide/leather. The presoaked hide/leather is next placed in a previously prepared DMS/bis-benzene prepolymer solution at temperatures less than 0° C. and time to permit the precursors to fully impregnate the hide/leather prior to reaction to form the polymer system.

In the preferred method for preparation of a bismaleimide-DDM-based HLP composite material, the hide leather is placed in a previously prepared solution of solvent, DDM, BMI and a catalyst, preferably DABCO, for sufficient time and at a sufficient temperature, typically ambient temperature, to permit full impregnation.

In the preferred method for bismaleimide-Jeffamine HLP composite materials, the hide/leather is impregnated for a sufficient time, and at a sufficient temperature, typically ambient temperature, with a previously prepared solution of BMI, DDM and a catalyst.

In the preferred method for siloxane-urea-based HLP composite materials, the hide/leather is presoaked in a solvent for a period of time to assure full penetration of the solvent within the hide/leather. The presoaked leather is next placed in a previously prepared PSX prepolymer solution at temperatures less than 0° C. to permit the precursors to fully impregnate the hide/leather prior to reaction to form the polymer system.

The impregnation may be effected at subambient temperatures or at any elevated temperature up to 200° C., the temperature at which hide/leather typically begins to thermally degrade. Higher temperatures within that range are particularly useful when it is desirable to obtain a lower viscosity within a given range of concentrations for the prepolymers.

Precursor Curing to Form a Polymer System

After the precursors have been impregnated into the hide/leather, the hide/leather may optionally be treated in a vacuum oven at a sufficient temperature and vacuum to remove remaining solvent.

If a pressed HLP composite is desired, a hot press is employed to complete the impregnation process and to more fully cure the polymer system.

After impregnation and curing is complete, the impregnated hide/leather may be, and preferably is, treated to remove any unreacted materials through solvent extraction.

The HLP composite may be, and preferably is, subjected to a drying step in a vacuum oven to remove any residual solvent.

The amount of cured polymer in the final composites of the invention is relatively high, and this accounts for the unique properties of the composites of the invention. Generally speaking, the final composites would include at least about 10% by weight cured polymer, more preferably from about 10–50% by weight cured polymer, and most preferably from about 10–40% by weight cured polymer. As explained, the polymeric content of the composites is located within the initial interstitial void spaced presented by the hide or leather in its unimpregnated state.

DETAILED DESCRIPTION OF THE PREFERRED EMBODIMENTS

Figure 1:
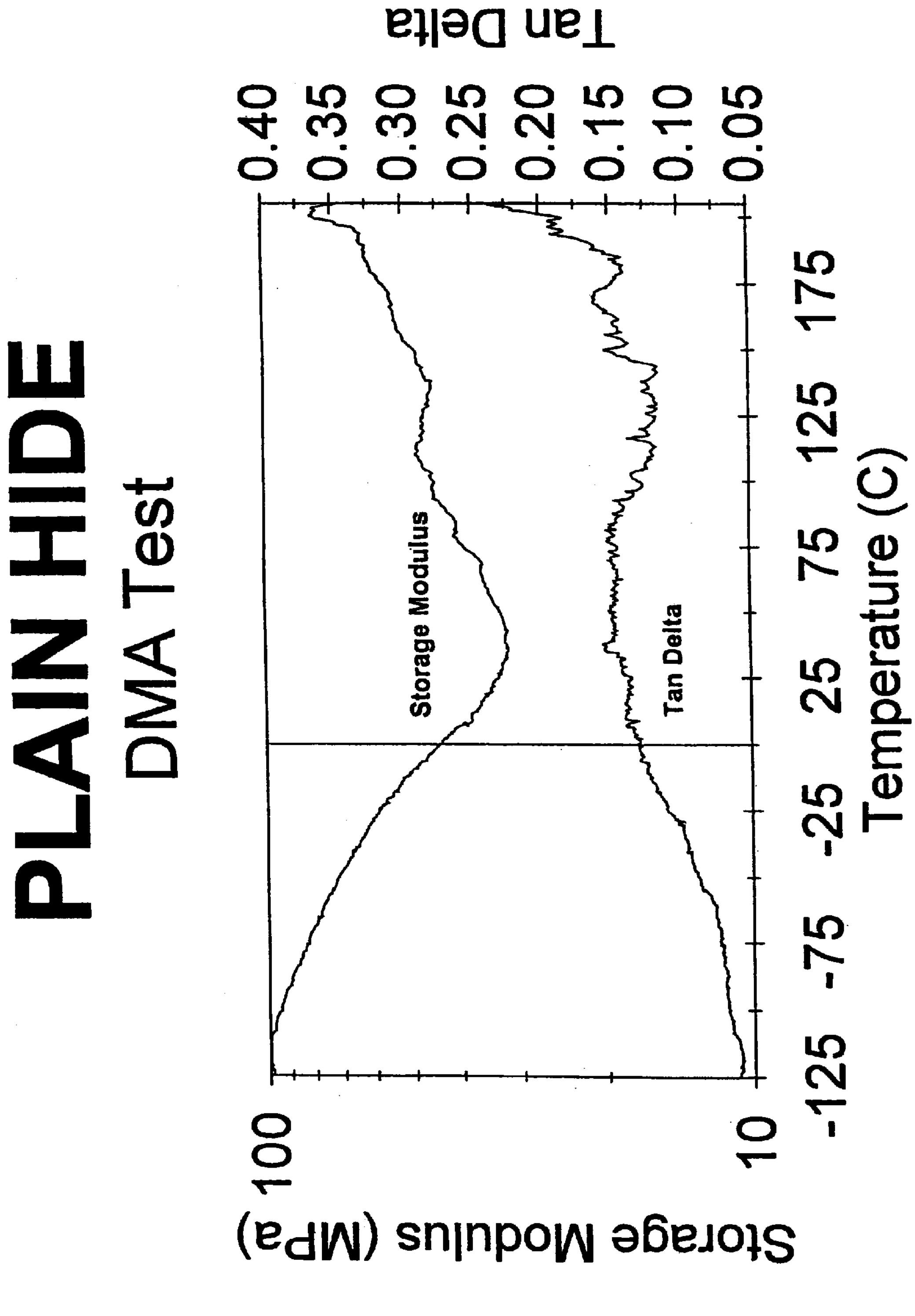
FIG. 1 is a plot showing the storage (flexural) modulus and tan delta for a plain hide sample as a function of temperature.
Figure 2:
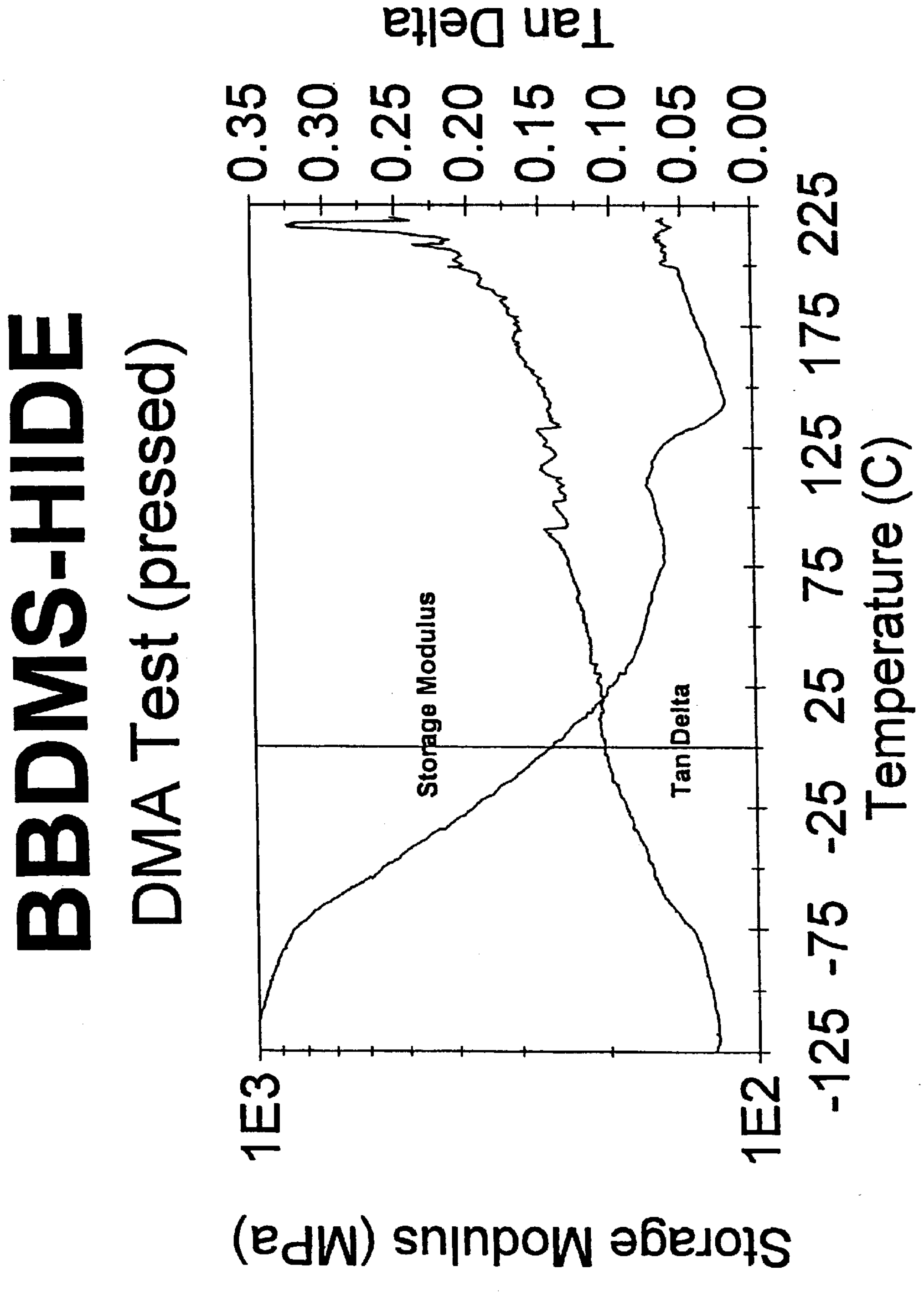
FIG. 2 is a plot showing the storage (flexural) modulus and tan delta for a BBDMS-hide (pressed) sample as a function of temperature.
Figure 3:
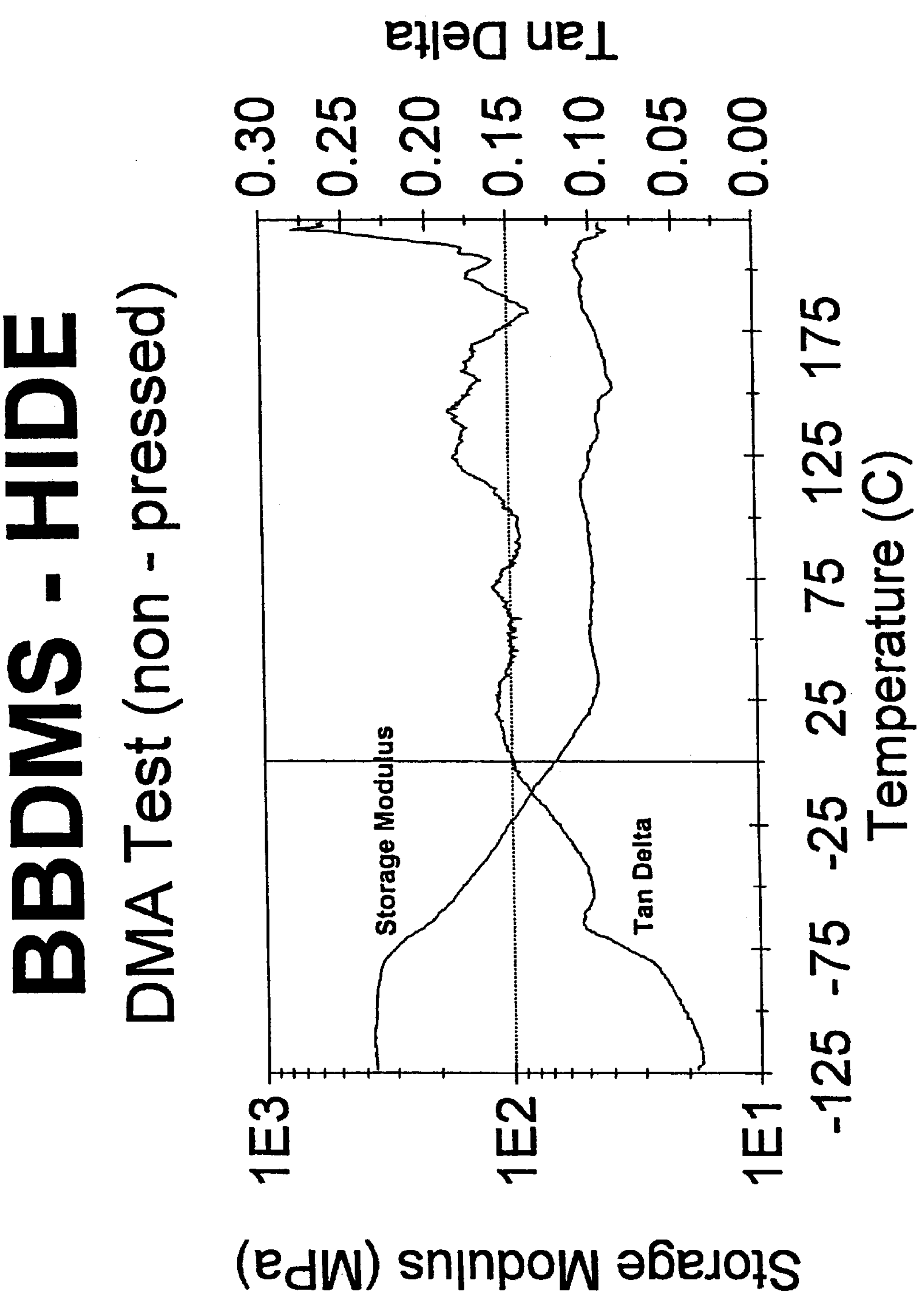
FIG. 3 is a plot showing the storage (flexural) modulus and tan delta for a BBDMS-hide (non-pressed) sample as a function of temperature.
Figure 4:
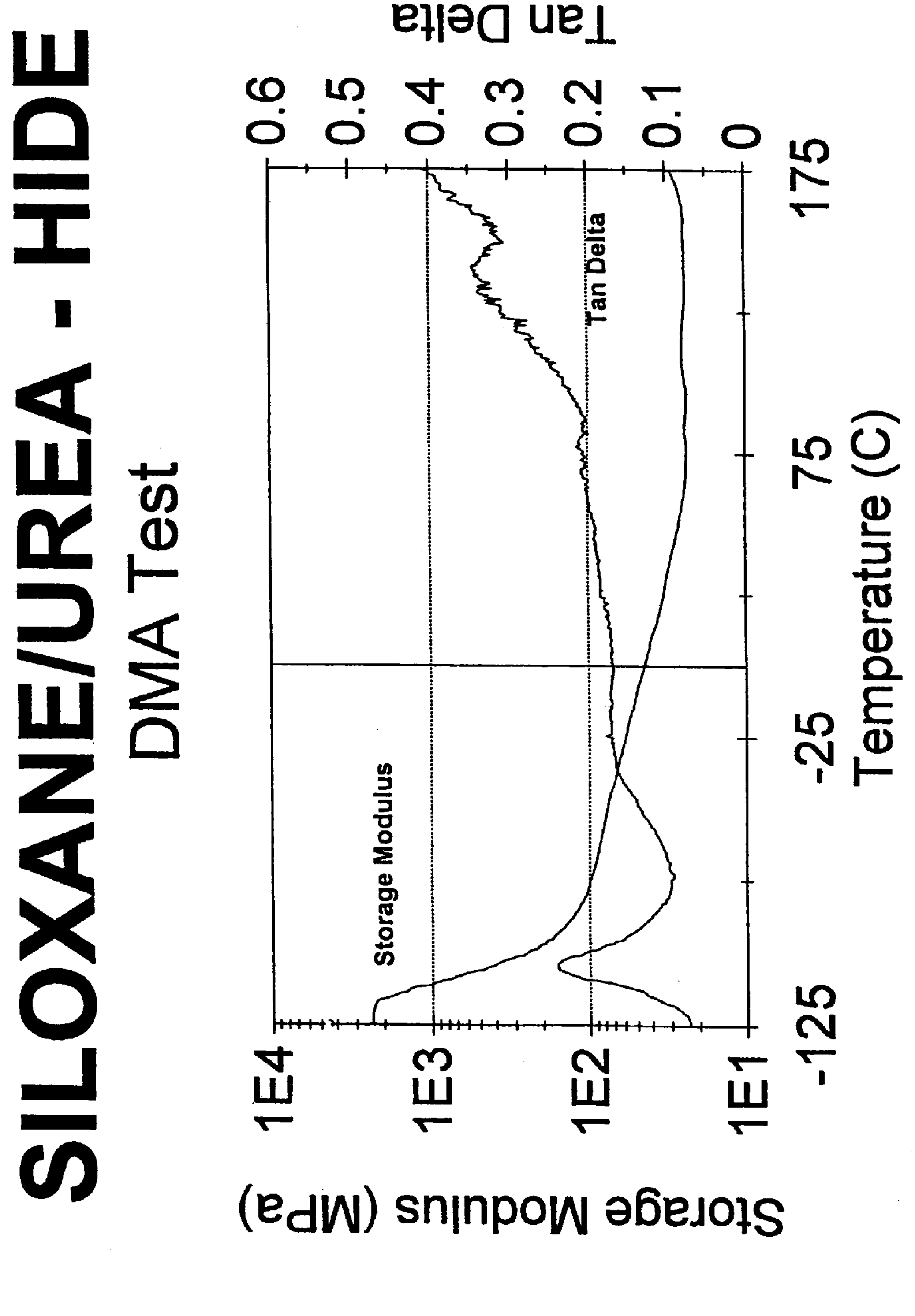
FIG. 4 is a plot showing the storage (flexural) modulus and tan delta for a siloxane/urea-hide sample as a function of temperature.
Figure 5:
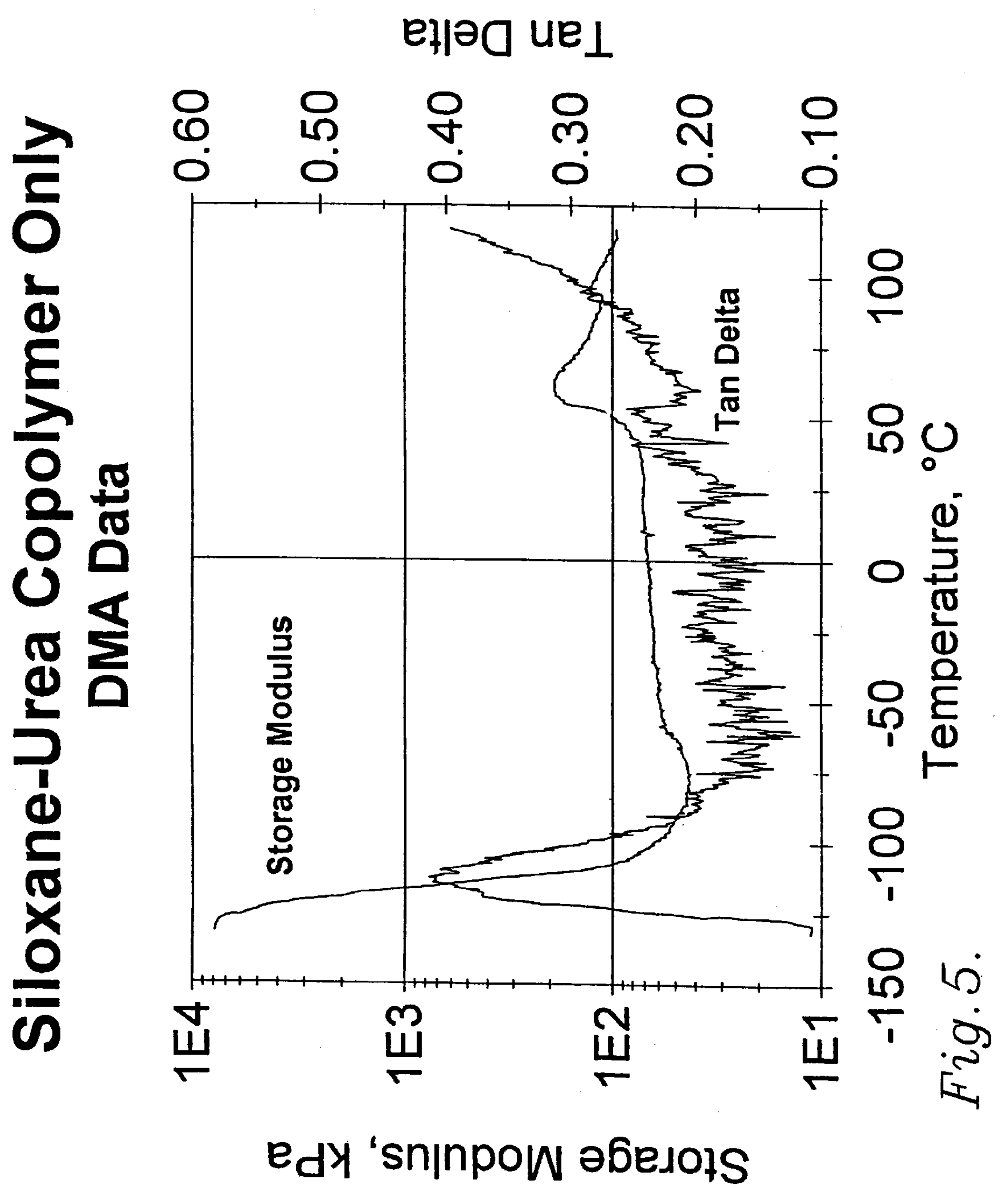
FIG. 5 is a plot showing the storage (compressive) modulus and tan delta for siloxane-urea copolymer.

The following examples set forth preferred embodiments and techniques for the formation of polymer system hide/leather composite materials, as well as test results demonstrating various desirable properties of the composite materials. It is to be understood, however, that these examples are presented by way of illustration only and nothing therein should be taken as a limitation upon the overall scope of the invention.

EXAMPLE 1

Leather-DMS-bis-benzene Composite

This example demonstrates that the instant invention could be practiced using polymer systems which generate gaseous by-products having the potential of creating undesirable void spaces in the finished composite product and the properties to be expected from formation of a composite with hide and an elastomer.

1. After cutting from chrome-tanned cowhide (unfinished leather) to the desired size, the sample was weighed and then soaked in tetrahydrofuran (THF) as a solvent for approximately 2 hours.

2. The amount of reactants were calculated so that the total mass of the polymer was equal to 50% of the mass of the dry hide. The bis-benzene:DMS molar ratio was 1:1.

3. Since the bis-benzene is a crystalline solid, it was necessary to dissolve the bis-benzene in the solvent, in this case THF. The leather was soaked in this solution for 30 minutes. The DMS then was diluted with THF at an approximate DMS:THF volume ratio of 1:5. Both the leather and DMS solution were cooled in an ice bath. The leather then was placed in the DMS solution at ice bath conditions; this system was left to react for 1 hour. During this portion of the impregnation process, pH paper was placed over the leather to confirm reaction.

4. If a non-pressed sample was desired, the leather was placed in a vacuum oven overnight to dry after step 3. If a pressed sample was desired, the leather was bagged and placed in the hot press for 8 hours at 30° C. and a pressure of 200 psi.

5. After pressing, the sample was placed in the vacuum oven overnight to evaporate any excess solvent.

Based upon a visual inspection, the composite material produced in this example did not possess appreciable void spaces created by the generation of HCL gas.

EXAMPLE 2

Leather-Siloxane-Urea Composite

This example demonstrates that stage-wise impregnation could be satisfactorily used in the practice of the instant invention to impregnate high viscosity, high molecular weight precursors.

1. After cutting to the desired size, the hide was weighed and soaked in tetrahydrofuran (THF) solvent for approximately 2 hours.

2. For the initial PSX batch, the mass of the PSX prepolymer corresponding to 50% of the mass of the dry hide. Although the molar ratio had to be maintained at 1:1 for the calculations, only the amount of PSX needed to be calculated.

3. The amount of PSX calculated in step 2 was measured out and diluted by about 50% in THF. Next, the leather was soaked in this solution for 2 hours.

4. For the final baths, a PSX:dry hide mass ratio of 1.5:1 was desired. The amount of PSX required for the final bath was diluted with THF by approximately 50%. The hide then was transferred to this bath and allowed to soak for 2 hours.

5. The amount of MDI calculated for the final bath was dissolved in THF. Then, both the hide and this MDI solution were placed in an ice bath to cool. Eventually, the final PSX and MDI solutions were combined; and, the leather was soaked in this solution while still in an ice bath for another 2 hours.

6. Subsequently, the hide was placed in a vacuum oven at 60° C. overnight to dry. After drying, the final product was placed in the hot press for 2 hours at 100° C. and a pressure of 275 psi.

EXAMPLE 3

Leather-Bismaleimide-DDM Composite

This example demonstrates that the instant invention could be practiced using polymer systems precursors normally requiring relatively high cure temperatures (substantially in excess of 200° C.) with the assistance of catalysts.

1. Ten grams of BMI was dissolved in 30 to 50 ml of dimethylformamide. 4,4'-diaminodiphenylmethane (DDM) was added to this solution such that the molar ratio of BMI-to-DDM was 1.3:1. 1,4-diazabicyclo-[2,2,2]-octane (DABCO) was added to this solution to achieve a catalyst concentration of 0.4 wt %.

2. Samples of chrome-tanned cowhide were placed in the solution above, and held at ambient temperature for a period of 1 to 2 days.

3. Upon removal from the solution, the impregnated hide sample was placed on a piece of aluminum foil to permit evaporation of the solvent at ambient conditions.

4. The sample was placed in a vacuum oven for one hour at a vacuum in the range of −25 to −30 kPa and a temperature of 100° C. to remove residual solvent. The operating conditions were chosen to facilitate removal of the solvent but to minimize any cure of the resin during this time.

5. The sample then was heated in a hot press at 100° to 120° C. and at a pressure of 8.6 psig for 2 hours.

6. The temperature of the hot press was increased to 150° C. for 12 hours at the previous pressure.

7. The system temperature was reduced to 49° C. while maintaining a system pressure of 8.6 psig for 1 hour.

8. At that point, the temperature was returned to ambient while the system pressure was maintained. Once the system returned to ambient temperature, the pressure was released and the sample removed.

EXAMPLE 4

Leather-Bismaleimide Composites

This example demonstrates that commercially popular polymer systems and curing agents could be used in the practice of the instant invention.

1. The sample of chrome-tanned hide to be utilized was presoaked to acetone for several or up to 20 hours.

2. Subsequent to soaking, the tanned hide was allowed to dry at ambient conditions.

3. The presoaked, dried hide samples were dried further at 90° to 100° C. and at a vacuum less than −90 kPa for 3 to 4 hours. The samples were weighed and their areas recorded after drying.

4. Ten grams of bismaleimide (BMI) monomer was dissolved in 25 to 40 mol of 1,4-dioxane. JEFFAMINE D-230 (Texaco Chemical Co.) was added to this solution such that the molar ratio of BMI-to-JEFFAMINE was 1.0:1.0.

5. The samples of chrome-tanned cowhide prepared in Steps 1 and 2 were placed in this solution of reagents, and held at ambient temperature, for 1 to 2 days.

6. Upon removal from the solution, the impregnated hide sample was placed on a piece of aluminum foil to permit evaporation of the solvent at ambient conditions.

7. The sample was placed in a vacuum oven at a room temperature for several hours at a vacuum less than −50 kPa to remove residual solvent. The vacuum was reduced to the −70 to −80 kPa range for an additional 24 to 36 hours. The intent was to minimize any cure of the resin during solvent removal.

8. The sample then was heated in a hot press according to the temperature and pressure schedule below:

a. (completion of impregnation) 90° to 95° C. at 2.3 psig for 1 hour b. (curing of polymer system precursors) 150° C. at 2.3 psig for 4 hours c. (curing of polymer system precursors) 160° C. at 3.8 psig for 24 hours d. (controlled cooling to prevent warping) 49° C. at 3.8 psig for 1 hour 9. The temperature was returned to ambient while the system pressure was maintained. Once the system returned to ambient temperature, the pressure was released and the sample removed.

A summary of mechanical properties associated with hide/leather alone and the hide/leather polymer composite materials are presented in Tables 1 and 2.

TABLE 1

Summary of Mechanical Properties of the HLP Materials Described Herein

| Sample | Resin Uptake (wt %) | Young's Modulus (MPa) | Tensile Strength (MPa) | Breaking Strength (MPa) |
|---|---|---|---|---|
| Hide/Leather Alone | Not | (2.4) | (.9) | (.9) |
| (unpressed) | Applicable | 46.7 | 23.4 | 23.4 |
| Hide/Leather Alone | Not | 266.9 | 16.8 | 16.5 |
| (pressed) | Applicable | | | |
| Unpressed | | (30.5) | (3.2) | (3.2) |
| Hide/Leather-DMS- | 23% | 244.5 | 19.9 | 19.9 |
| Bis-Benzene | | | | |
| Composite | | | | |
| Pressed Hide/Leather- | | (36.8) | (3.7) | (3.7) |
| DMS-Bis-Benzene | 17% | 297.4 | 21.79 | 21.8 |
| Composite | | | | |
| Hide/Leather-Siloxane- | 28% | 449.6 | 32.76 | 31.7 |
| Urea | | | | |
| Bismaleimide-DDM | Not | 6028 | 24.3 | 24.3 |
| | Applicable | | | |
| Hide/Leather-Bismalei- | | (951) | (4.4) | (8.4) |
| mide-DDM | 27% | 2550. | 19.4 | 16.6 |
| Bismaleimide-JEFFAMINE | Not | | (6.3) | (4.7) |
| | Applicable | 9346. | 62.8 | 60.3 |
| Hide/Leather-Bismalei- | | (907) | (3.8) | (3.8) |
| mide-JEFFAMINE | 36% | 3371 | 39.2 | 39.2 |

*Standard deviations are included in parentheses when applicable.

TABLE 2

Summary of Mechanical Properties of the HLP Materials Described Herein

| Sample | Yield Strength (MPa) | Percent Elongation at Break | Energy to Break Point (Joules) | Izod Impact Data ($ft\text{-}lb_f/in$) |
|---|---|---|---|---|
| Hide/Leather Alone | | (3.64) | (2.5) | Not Appli- |
| (unpressed) | 1.56 | 44.3 | 17.5 | cable |

TABLE 2-continued

Summary of Mechanical Properties of the HLP Materials Described Herein

| Sample | Yield Strength (MPa) | Percent Elongation at Break | Energy to Break Point (Joules) | Izod Impact Data (ft-$lb_f$/in) |
|---|---|---|---|---|
| Hide/Leather Alone (pressed) | 0.452 | 41.2 | 14.22 | Not Applicable |
| Unpressed Hide/Leather-DMS-Bis-Benzene Composite | Not Available | 32.8 | (3.5) 12.5 | Not Applicable |
| Pressed Hide/Leather-DMS-Bis-Benzene Composite | Not Available | (6.4) 27.9 | (4.3) 12.3 | Not Applicable |
| Hide/Leather-Siloxane-Urea | Not Available | 77.4 | 21.00 | Not Applicable |
| Bismaleimide-DDM | 8.6 | 2.5 | 0.20 | 1.0 |
| Hide/Leather-Bismaleimide-DDM | (2.4) 13.5 | (.286) 2.0 | (.012) 0.125 | 1.9 |
| Bismaleimide-JEFFAMINE | (2.2) 6.8 | (.77) 7.4 | (.09) 0.59 | 1.3 |
| Hide/Leather-Bismaleimide-JEFFAMINE | (5.6) 19.1 | (.2) 2.3 | (.078) 0.370 | 4.1 |

The results obtained in the examples presented in Tables 1 and 2 demonstrate that new composite materials may be synthesized according to the instant invention which possess improved mechanical properties. The tensile strength, breaking strength, and Young's modulus of composite system using relatively brittle polymers resemble those of the polymer systems alone, while the notch toughness and impact resistance (both of which are based upon Izod impact data) are enhanced by formation of the composite material. When the polymer systems of interest are rigid or brittle in nature, the resulting composite material possesses improved notch strength (based upon Izod impact data) and vibration dampening (based upon interpretation of DMA data presented in FIGS. 1–4) characteristics when compared to the polymer system alone.

Figure 6:
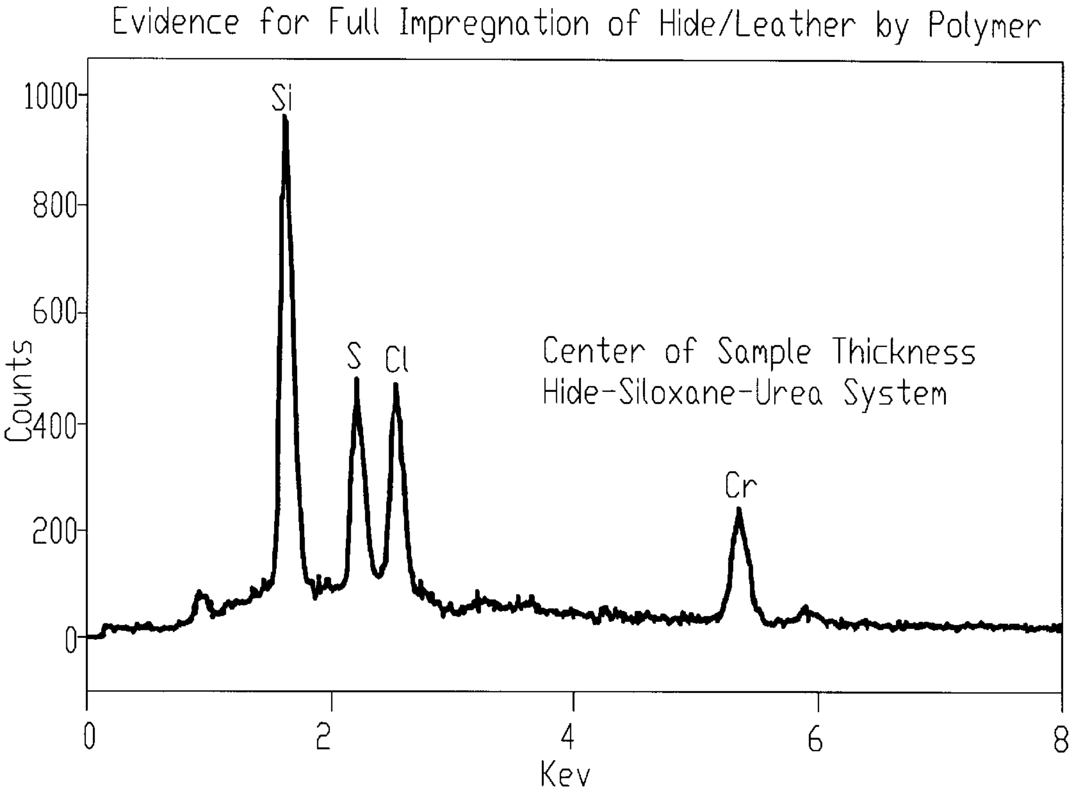
FIG. 6 is a plot showing spectra acquired via energy dispersive spectroscopy of a hide-siloxane-urea system—center of sample thickness showing the presence of silicon.
Figure 7:
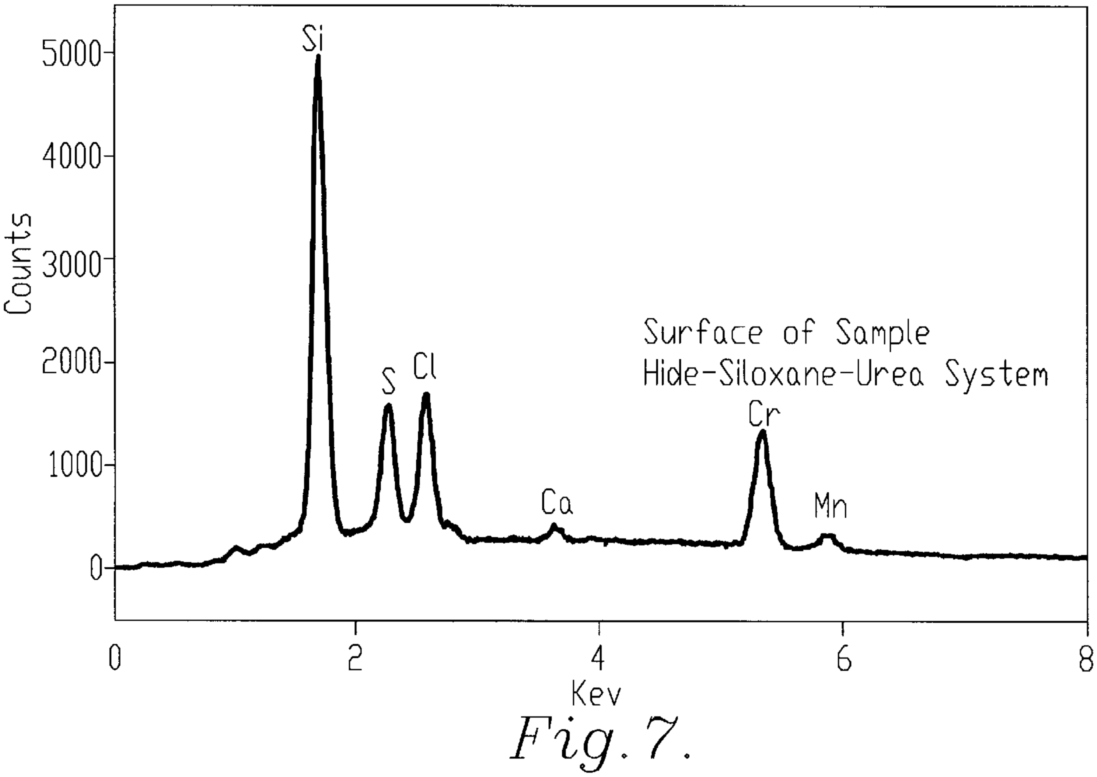
FIG. 7 is a plot showing spectra acquired via energy dispersive spectroscopy of a hide-siloxane-urea system—surface of sample thickness showing the presence of silicon.
Figure 8:
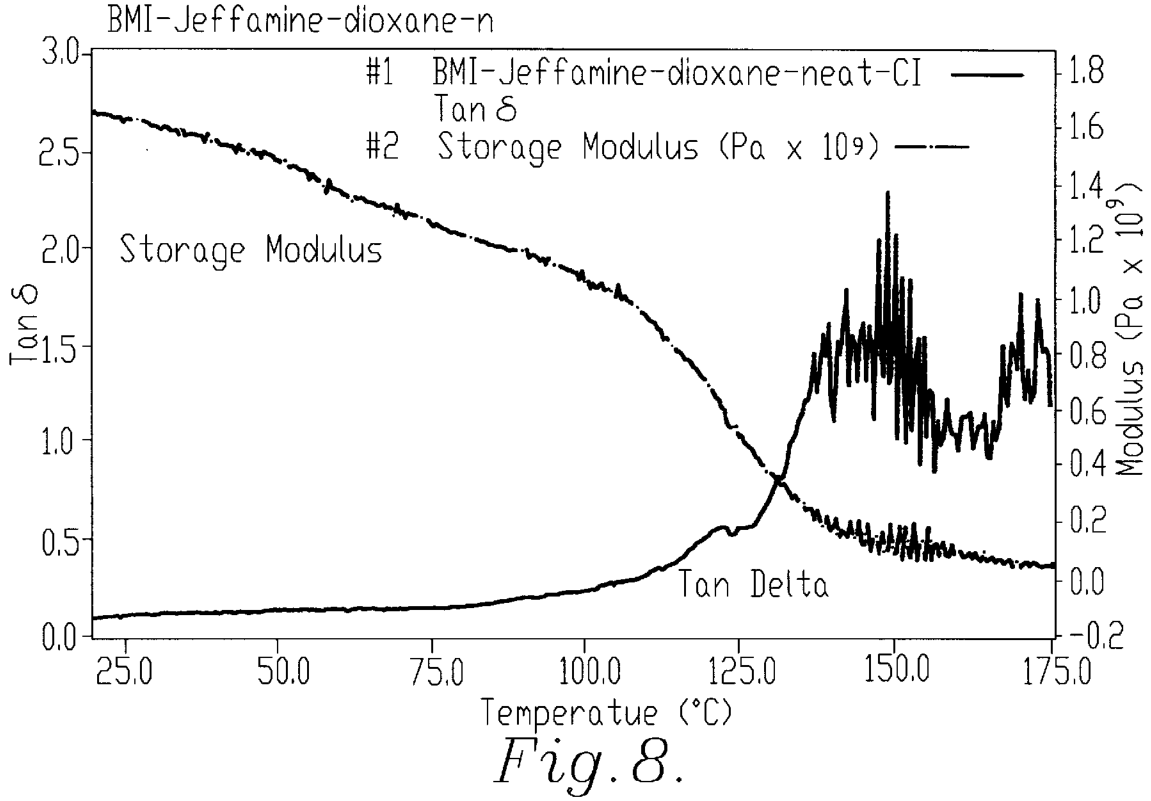
FIG. 8 is a plot showing the storage (flexural) modulus and tan delta for the BMI-Jeffamine (D230) polymer.
Figure 9:
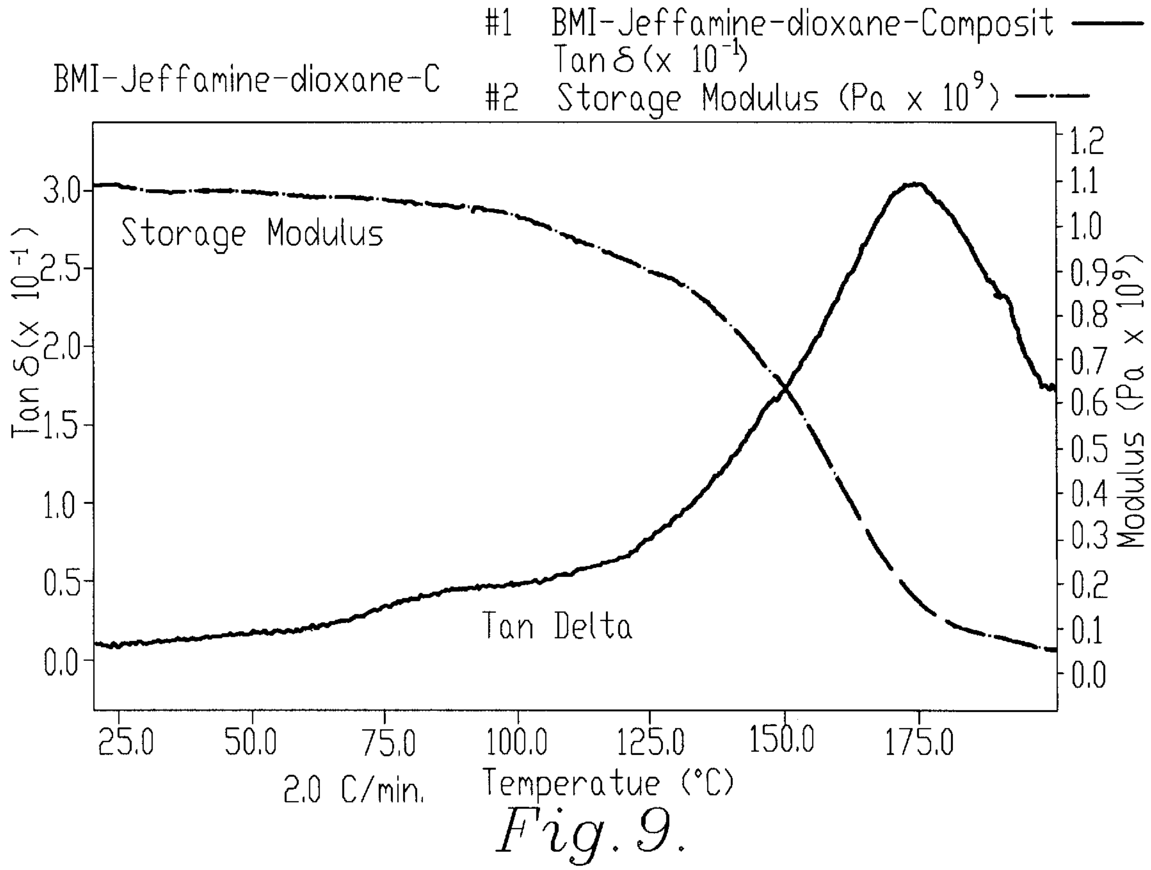
FIG. 9 is a plot showing the storage (flexural) modulus and tan delta for the hide-BMI-Jeffamine (D230) sample.
Figure 10:
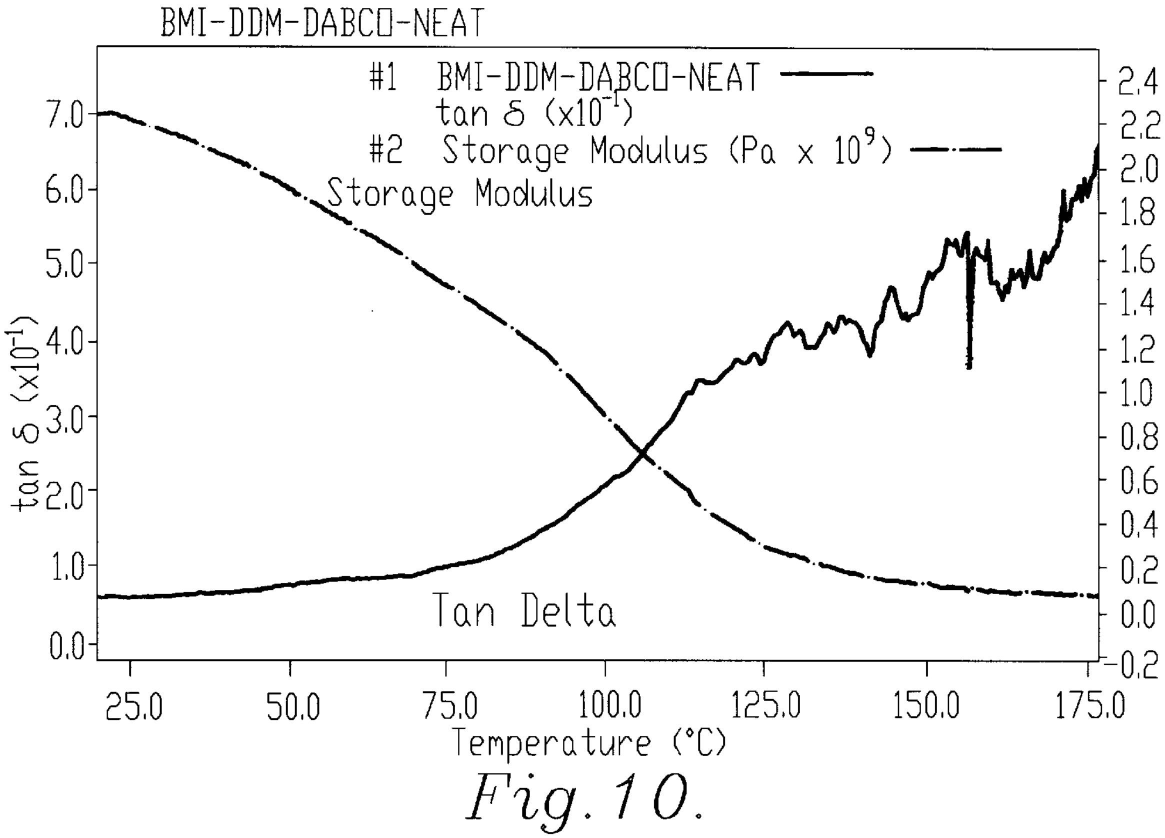
FIG. 10 is a plot showing the storage (flexural) modulus and tan delta for the BMI-DDM-DABCO polymer.
Figure 11:
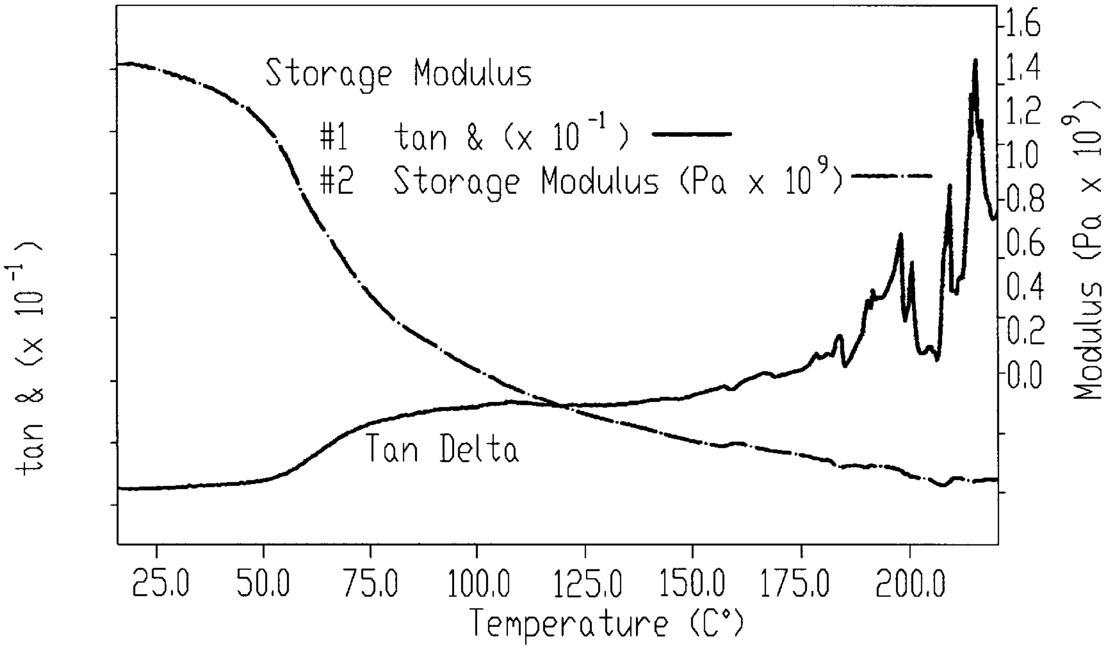
FIG. 11 is a plot showing the storage (flexural) modulus and tan delta for the hide-BMI-DDM-DABCO sample.

In each example, 1–4, the impregnated leather was visually inspected and each sample was found to be fully impregnated. Full impregnation of leather was also demonstrated by data appearing in FIGS. 6 and 7. FIGS. 6 and 7 present two spectra acquired via energy dispersive spectroscopy (EDS) on a scanning electron microscope. This particular technique obtains chemical information about the sample from the energies of X-rays emitted during exposure of the sample to an electron beam (in this case, generated by the scanning electron microscope). The chemical information is specific to that region of the sample exposed to the electron beam; i.e., it can give chemical information about the small area of the sample. The EDS data presented in FIGS. 6 and 7 were obtained from a cross-section of a siloxane-urea-hide sample at both the surface (FIG. 7) and at the center of the sample (FIG. 6). The only source for the silicon is the polymeric material impregnated into the leather. The obvious presence of silicon at the center of the sample is clear evidence that the siloxane-urea polymer is present throughout the leather; thus demonstrating that full impregnation was achieved.

As used herein, "fully impregnated" means that the interstitial void spaces between the collagen fibers existing throughout the entire thickness of the collagen fiber network of the hide/leather have been substantially filled with the polymer system precursor solution during impregnation. Upon curing, the precursors form a polymer matrix which is laced inextricably throughout the collagen fiber network of the hide/leather. In this sense, the hide/leather is said to be fully impregnated with the polymer system. Thus, the combined bulk properties of the HLP composite material (e.g., toughness, strength, modulus) are substantially different than the bulk properties of either the hide/leather or a cured polymer system alone.

For instance, a bulk property associated with leather useful for shoe uppers is that such leather has the capability of absorbing and permeating vapor from perspiration. When fully impregnated with a polymer system of the instant inventions (such as bismaleimides or siloxane-based polymers), this bulk property is markedly reduced in the resulting HLP composite. It will be appreciated, however, that the HLP composite of the instant invention will possess many other very beneficial properties (as previously discussed).

It will also be appreciated, however, that comparatively small regions of the hide/leather composite may exist as voids (less than about 10% total volume of void spaces existing between the pretreated, unimpregnated hide/leather) without reducing the extent to which the HLP bulk properties are improved over those of the hide/leather or polymer system individually. For example, the hide/leather may have small, very dense regions which will not permit impregnation. Consequently, when it is stated herein that the hide/leather is fully impregnated, it is also meant that if interstitial void regions exist in the composite collagen network that lack the presence of polymer, such deficiency is not sufficient to materially modify the extent to which the natural properties of the hide/leather or polymer system are changed in the HLP composite.

The incorporation of an elastomeric or tough polymer into the composite material provides improved elastomeric behavior of the composite material whose properties are intermediate between those of the polymer and the hide/leather. Other properties such as tear resistance may be significantly enhanced by the presence of the hide. For example, incorporating a siloxane-urea polymer into the hide/leather produces a sample with the following changes in properties when compared to the hide/leather itself:

1. The low temperature (<−100° C.) flexural modulus of the composite material (based upon interpretation of DMA data presented in FIGS. 1–4) is approximately 10 times higher than that of the hide/leather alone.

2. After prolonged exposure to ambient conditions, the flexibility of the hide/leather increases with the incorporation of the siloxane-urea polymer.

3. The percent strain at break of the material increases from approximately 40% for the hide/leather alone to over 100% for the hide/leather polymer composite material based on siloxane-urea polymers.

The hide/leather polymer composite materials also possess the advantage that they may be formed with properties which approach or exceed those of the polymer alone without being as expensive as the polymer system. In particular, the results developed in the examples demonstrate the ability of the composite to retain many of the properties of the polymer system at polymer system concentrations as low as 30wt %.

The instant invention should not be viewed as limited to the specific examples discussed. The instant invention may be practiced so long as:

1. the monomers, prepolymers or resin systems selected are capable of impregnation into hide or leather before significant polymerization can occur; and 2. subsequent polymerization to the polymer distributed throughout the hide/leather occurs.

In addition, polymer systems used in the practice of the instant invention may be those where polymerization proceeds via condensation reaction mechanisms, as well as via addition reaction mechanisms. In the latter respect, such addition reactions may be initiated by techniques such as gamma-ray irradiation or the addition of an initiator or catalyst.

The DMA data disclosed herein was collected on a Perkin-Elmer DMA System 7 with a 3-point flexural and a compression accessory. Terms relating to dynamic mechanical measurements on plastics, as used herein, should be construed in accordance with ASTM standard test procedure D 4092-83a, "Standard Definitions and Descriptions of Terms Relating to Dynamic Mechanical Measurements on Plastics."

TERMINOLOGY/DEFINITIONS:

| | |
|---|---|
| chrome-tanned leather | leather that has been tanned with chromium compounds but which has not been dyed or fat liquoured (see T. C. Thorstensen, Practical Leather Technology (R. E. Krieger Publishing Co., Malabar, FL 1985) p. 320) |
| hide | the pelt of a large animal, such as a cow, horse, sheep, pig, etc.; often used interchangeably with skin (see T. C. Thorstensen, Practical Leather Technology (R. E. Krieger Publishing Co., Malabar, FL 1985) p. 320) |
| hide/leather | used in situations when hide, leather, or any product intermediate in the processing of the hide to finished leather (such as chrome-tanned leather) is appropriate to the discussion |
| HLP composite | abbreviation used herein for a composite material prepared from hide/leather and a polymer system |
| leather | hides or skins that have been tanned |
| polymer | a high molecular weight compound prepared from lower molecular weight precursors (including monomer reactants, prepolymers or resins); usage herein will imply that the material will have been reacted to a form typical of its engineering applications |
| prepolymer | partially polymerized systems which are still capable of liquid flow |
| resin | a partially polymerized substance that typically exhibits tackiness which can be subsequently reacted to form the final polymeric material, is capable of flow at elevated temperature, and typically can be dispersed in an appropriate solvent |

ABBREVIATIONS:

| | |
|---|---|
| bis-benzene | 1,4-bis(dimethylhydrosilyl)benzene |
| BMI | 1,1'- (methylenedi-1,4-phenylene)bismaleimide (also known as N,N'-bismaleimide-diphenyl methane) |
| DABCO | 1,4-diazabicyclo[2,2,2]-octane |
| DDM | 4,4'-diaminodiphenylmethane (also known as 4,4'-methylene dianiline)15. |
| DMS | dimethyldichlorosilane |
| JEFFAMINE | any of a series of polyoxypropyleneamines commercially available as part of the "JEFFAMINE" series. In the development effort described herein it specifically refers to JEFFAMINE D-230 (having a molecular weight of approximately 230 g/mole) |
| MDI | 4,4'-diphenylmethane diisocyanate |
| PSX | aminopropyldimethyl-terminated polydimethylsiloxane (Huls America, Number Averaged Molecular Weight of about 2500; undiluted viscosity of about 50 centipoise) |

REFERENCES:

Bay, H., G. Eckert, and W. Bergold, "Waterproofing of Leather, Pelts or Leather Substitutes with Siloxanes," Fed. Rep. Ger. Patent 3,800,629 (20 Jul. 1989).

Buechler, P. R., P. L. Kronick, and F. Schlonick, "Radiation Polymerized Graft Copolymers for Leather," in *Renewable-Resource Materials* (C. E. Carraher, Jr. and L. H. Sperling, Eds.) (Plenum Press, New York, 1986) pp. 251–258.

Feairheller, S. H., A. H. Korn, E. H. Harris, E. M. Filchione, and M. M Taylor, U.S. Pat. No. 3,843,320 (1974).

Friese, H. H., and W. Prinz, "Waterproofing of Fashion Leathers," *Leder-Haeutemarkt* 38 (32), 5–6, 8–10 (1986).

Harris, E. H., M. M Taylor, and S. H. Feairheller, *J. Am. Leather Chem. Assoc.* 67, 111 (1972).

Jordan, E. F., Jr., B. Artymyshyn, A. L. Everett, M. V. Hannigan, and S. H. Feairheller, "Polymer-Leather Composites. I. Process and Location Study for the Deposition of Selected Acrylate Monomers by Polymerization into Chrome-Tanned Cattlehide," *J. Appl. Polym. Sci.* 25, 2621–2647 (1980).

Jordan, E. F., Jr., and S. H. Feairheller, "Polymer-Leather Composites. II. Kinetics of the Deposition of Selected Acrylate Monomers by Polymerization into Chrome-Tanned Cattlehide," *J. Appl. Polym. Sci.* 25, 2755–2776 (1980).

Jordan, E. F., Jr., B. Artymyshyn, M. V. Hanningan, R. J. Carroll, and S. H. Feairheller, "Polymer-Leather Composites V. Preparative Methods, Kinetics, Morphology, and Mechanical Properties of Selected Acrylate Polymer-Leather Composite Materials," in *Polymer Applications of Renewable-Resource Materials* (Polymer Science and Technology, Vol. 17) (C. E. Carraher, Jr. and L. H. Sperling, Eds.) (Plenum Press, New York, 1983) pp. 407–452.

Khananashvili, L. M., Sh. V. Pichkhadze, M. D. Mikhailov, et al., "Composition for Waterproofing Leather," Soviet Patent 1,244,182 A1 (15 July 1986).

Korasteleva, Z. K., "New Methods [for Leather Treatment]," Kozh.-Obuvn. Prom-st. 20(10), 20–21 (1978).

Korn, A. H., S. H. Feairheller, and E. M. Filachione, *J. Am. Leather Chem. Assoc.* 67, 111 (1974).

Kronick, P. L., B. Artymyshyn, P. R. Buechler, and W. Wise, "Viscoelasticity of Calf Hide Impregnated with Radiation-Polymerized Polyhydroxyethyl Methacrylate,: in *Renewable-Resource Materials* (C. E. Carraher, Jr. and L. H. Sperling, Eds.) (Plenum Press, New York, 1986) pp. 235–250.

Kronick, P. L., P. Buechler, F. Scholnick, and B. Artymyshyn, *J. Appl. Phys.* 30, 3095–3106 (1985).

Lowell, J. A., and P. R. Buechler (to Rohm and Haas Co.), U.S. Pat. No. 3,441,365 (Apr. 29, 1969).

Lowell, J. A., E. H. Kroeker, and P. R. Buechler (to Rohm and Haas Co.), U.S. Pat. No. 3,231,420 (Jan. 25, 1966).

Lowell, J. A., H. L. Hatton, F. J. Glavis, and P. R. Buechler (to Rohm and Haas co.), U.S. Pat. No. 3,103,447 (Sept. 10, 1963).

Mattei, I. V. (to Rohm and Haas Co.), Belg. Patent 637,052.

Neher, M. B. and V. B. Vely (to Titekote Corp.), U.S. Pat. No. 3,066,997 (Dec. 4, 1962).

Nikka Chemical Industry and Shimizu Chemical K. K., "Treatment of Leather," Japanese Patent 58,080,400 A2 (14 May 1983).

Radzynkiewicz, R., and M. Mikula, "Studies on the Use of Polish Silicones. Part I. Waterproofing of Upper Leathers with Silicones in Solvents," Przegl. Skorzany 31(10), 308–312 (1976).

Rao, K. P., K. T. Joseph, and Y. Nayudamma, "Characterization of the Collagen-Vinyl Graft Copolymers Prepared by the Ceric Ion Method. II. Infrared Spectra and electron Microscopy," *J. Appl. Polymer Sci.,* 16, 975–0986 (1972).

Rao, K. P., K. T. Joseph, and Y. Nayudamma, "Characterization of the Collagen-Vinyl Graft Copolymers Prepared by the Ceric Ion Method. I. Solution Properties," *J. Appl. Polymer Sci.*, A-1, 9, 3199–3212 (1971).

Toth, B., "Impregnation of Leather," Bor-Cipotech 31(7), 241–247 (1981).

Zakharova, S. V., L. V. Slobodskikh, M. B. Mikhailov, and L. K. Tsivinskaya, "Oligomeric Organotitanium Compounds in Compositions for Water-repellency Treatment of Leathers," *Kozh.-Obuvn. Prom-st.,* 25–27 (1992).

Zurabyan, K. M., V. I. Sidorov, M. I. Filimonova, et al., "Use of Ethyl Silicate and Still Residues from Its Production for the Waterproofing of Leather," *Kozh.-Obuvn. Prom-st,* 37–39 (1984).

Zurabyan, K. M., K. S. Pushchevaya, L. V. Slobodskskh, et al., "Rendering Suede Leather for Shoe Uppers Water-repellent," Soviet Patent 922,148 Al (23 Apr. 1982).

Zurabyan, K. M., V. V. Nepomnina, L. V. Slobodskskh, et al., "Waterproofing of Leather with Organosilicon Compounds," *Kozarstvi* 30(10), 296–297 (1980).

We claim:

1. A polymer hide/leather composite comprising an animal hide or leather, said hide or leather presenting in its unimpregnated state a network of fibers, said fibers separated by initial interstitial void spaces, said hide/leather composite being substantially fully impregnated with a quantity of polymer interspersed within said void spaces and forming therein a polymer matrix within said fiber network, said polymer matrix comprising at least about 10% by weight of said hide/leather composite.

2. The composite of claim 1, said polymer being DMS-bis-benzene.

3. The composite of claim 2, said composite having the Young's modulus greater than 240 MPa.

4. The composite of claim 2, said composite having the tensile strength greater than 19 MPa.

5. The composite of claim 2, said composite having the breaking strength greater than 19 MPa.

6. The composite of claim 1, said polymer being siloxane-urea.

7. The composite of claim 1, said polymer being bismaleimide-DDM.

8. The composite of claim 7, said composite having a Young's modulus greater than 2500 MPa.

9. The composite of claim 2, said composite having a tensile strength greater than 19 MPa.

10. The composite of claim 2, said composite having a breaking strength greater than 16 MPa.

11. The composite of claim 7, said polymer being bismaleimide-Jeffamine.

12. The composite of claim 1, said composite impregnated void space being greater than 90% of total void space existing in unimpregnated hide/leather.

13. The composite of claim 1, said matrix comprising from about 10–50% by weight of said hide/leather composite.

14. The composite of claim 13, said matrix comprising from about 15–40% by weight of said hide/leather composite.

15. A polymer hide/leather composite comprising an animal hide or leather, said hide or leather presenting a network of fibers, said fibers separated by interstitial void spaces, said hide/leather being substantially fully impregnated with a quantity of polymer interspersed within said void spaces and forming therein a polymer matrix within said fiber network, said polymer being selected from the group consisting of DMS-bis-benzene, siloxane-urea and bismaleimide-Jeffamine, and said polymer matrix comprising at least about 10% by weight of said hide/leather composite.

* * * * *